Nov. 25, 1958

K. E. POPE 2,861,789

ACCELEROMETER

Filed Nov. 17, 1954

INVENTOR.
Kenneth E. Pope
BY

Nov. 25, 1958 K. E. POPE 2,861,789
ACCELEROMETER
Filed Nov. 17, 1954 4 Sheets-Sheet 2

INVENTOR.
Kenneth E. Pope
BY

Nov. 25, 1958
K. E. POPE
2,861,789
ACCELEROMETER
Filed Nov. 17, 1954
4 Sheets-Sheet 3
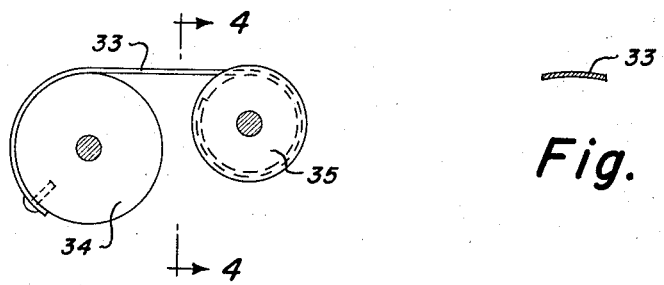
Fig. 3
Fig. 4
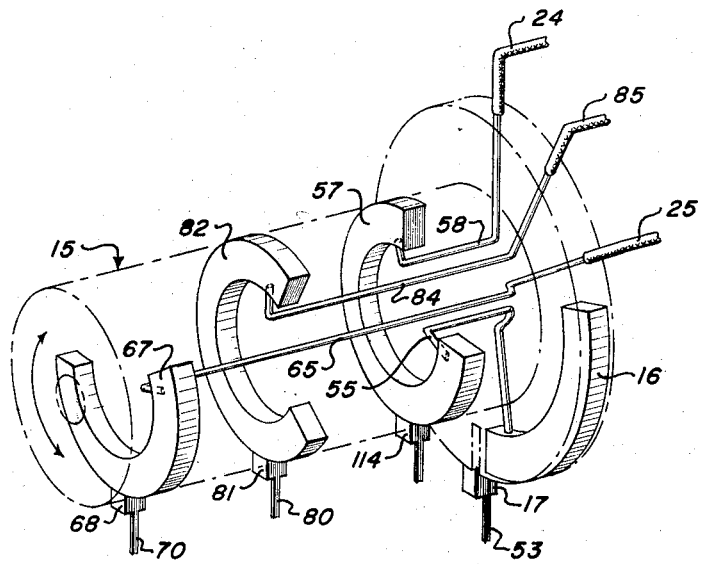
Fig. 5
INVENTOR.
Kenneth E. Pope
BY Nov. 25, 1958  K. E. POPE  2,861,789
ACCELEROMETER
Filed Nov. 17, 1954  4 Sheets-Sheet 4

INVENTOR.
Kenneth E. Pope
BY
Roland A. Anderson
Attorney

United States Patent Office 2,861,789
Patented Nov. 25, 1958

2,861,789

ACCELEROMETER

Kenneth E. Pope, Albuquerque, N. Mex., assignor, by mesne assignments, to the United States of America as represented by the United States Atomic Energy Commission Application November 17, 1954, Serial No. 469,567

14 Claims. (Cl. 264—1)

The present invention relates to means or a device which may be utilized for measuring acceleration and more particularly to such means of high sensitivity and accuracy throughout a relatively wide range of accelerations. Devices of this nature are generally referred to as accelerometers.

It is frequently desirable to operate a switch or control some circuit or mechanism in response to acceleration of a vehicle, or upon a vehicle attaining a predetermined velocity, or when it has travelled a given distance. Many vehicles with which accelerometer use is desirable travel very rapidly and performance requirements make it essential that the circuit or mechanism be controlled or actuated with great exactitude by some highly sensitive and accurate but yet rugged and relatively simple accelerometer. Preferably the accelerometer is one which may be utilized "as is," or with minor adjustments, with vehicles that are during travel subjected to a considerable range of accelerations and velocities.

The providing of an accelerometer embodying a combination of the above and various other desirable qualities has proven difficult. Various constructions have been devised and some of them have proven satisfactory for use with certain vehicles or under certain conditions. However, most of them have lacked some desirable quality or qualities. For example, some have not been sufficiently sensitive to accelerations and hence have failed to effect control or actuation at an appropriate instant or location; others have been objectionably affected by extremes of temperature, or have lacked ruggedness, simplicity, or compactness. Still others which have incorporated bellows and orifices for controlling fluid flow have given rise to manufacturing and calibration difficulties.

The present invention aims to overcome the above and other difficulties or disadvantages by providing a new and improved accelerometer of relatively simple construction and operation which is highly sensitive to acceleration variations and is capable of controlling an associated circuit or device with great accuracy. The invention further contemplates the provision of such an accelerometer which is of rugged, simple, compact and light weight construction and the operation of which is substantially unaffected by either high or low temperature extremes.

An object of the present invention is to provide a new and improved accelerometer.

Another object of the invention is to provide an accelerometer of improved sensitivity and accuracy.

Another object of the invention is to provide a sensitive and accurate electrical accelerometer.

A further object of the invention is to provide an accelerometer of enhanced sensitivity and accuracy of operation which remains substantially unimpaired by temperatures throughout a temperature range that extends from very low to very high.

A still further object of the invention is to provide a new and improved accelerometer that is of relatively rugged, simple, compact, lightweight and inexpensive construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof will have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modificaitons as are best adapted to the particular use contemplated.

In the accompanying drawings,

Fig. 3 is an end view of a yieldable means or spring that may be employed for urging the accelerometer toward a neutral position;

Fig. 4 is a sectional view taken along line 4—4 of Fig. 3, showing the cross-sectional configuration of a preferred form of spring;

Fig. 5 is a phantom perspective view illustrating features of a commutator that may be employed with the present accelerometer.

Figure 1:
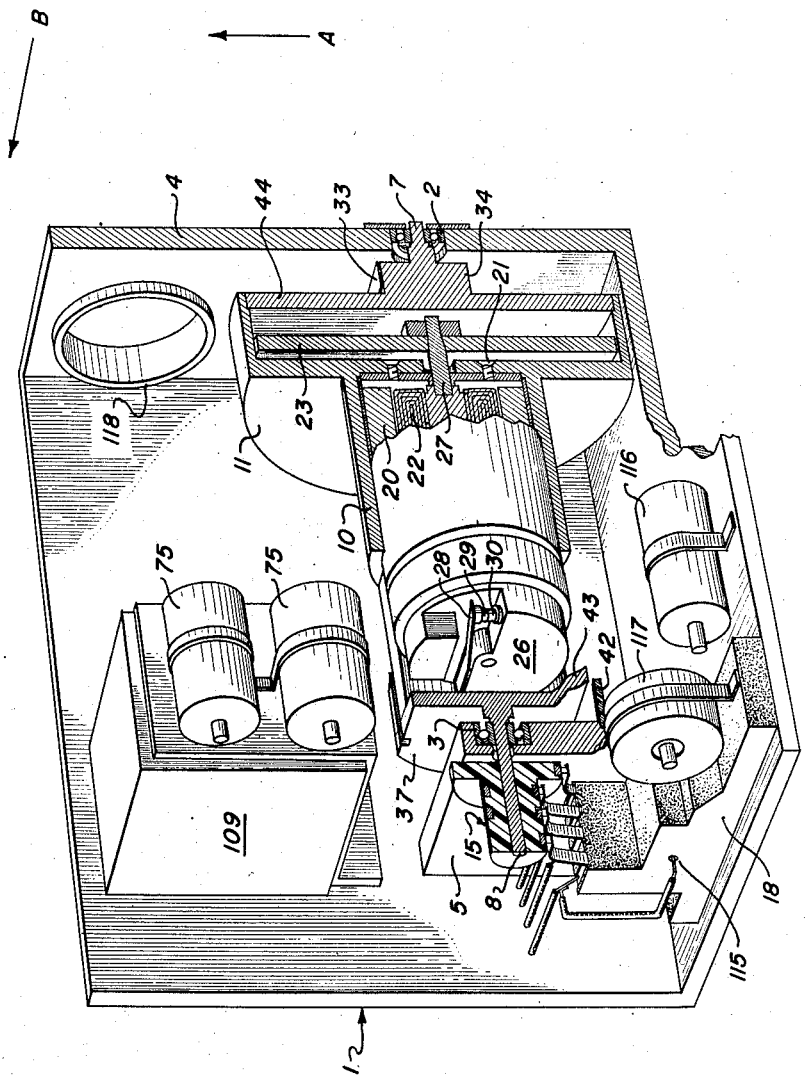
Fig. 1 is a simplified perspective view, partly broken away, showing features of a preferred embodiment of the invention.

As shown more particularly in Figs. 1, 2 and 5, the present accelerometer comprises a support means or housing 1 carrying on spaced end wall 4 and support wall 5 bearings 2 and 3 that support extension shafts or pivot pins 7 and 8 which carry a casing or a stator element 10 so that the stator may rotate, to a limited extent as will be hereinafter brought out, about a longiudinal axis exending through the shaft extensions 7 and 8. The stator, preferably of some substantially non-magnetic, lightweight material such as aluminum or strong synthetic plastic material, has an enlarged flywheel-encircling portion 11 which carries a weight or mass 13 at a location spaced from the longitudinal axis through shafts or pivot pins 7 and 8. When the device is subjected to acceleration in a direction that is not coincident with a plane passing through both said longitudinal axis and the offset or unbalancing weight 13, e. g., is subjected to motion at right angles to said plane (in the direction of arrow A in Fig. 1 and up out of the paper in Fig. 2) inertia of the weight 13 causes it to move toward a position of alignment with the direction of acceleration and to thereby correspondingly rotate the stator 10 (clockwise as viewed from the left end of Fig. 1).

This stator rotation correspondingly turns a commutator member 15, fixed by a set screw to the shaft 8, so that a conducting segment 16 embedded in the plastic material of the commutator moves into contact with a stationary contact or brush member 17 carried by a non-conducting brush block 18 which is secured to the housing 1.

The brush 17 is so electrically connected with an appropriate power supply, for example, a battery (not shown), that establishment of contact between brush 17 and conducting segment 16 is effective to energize, through conductors 24 and 25 (Figs. 2, 5 and 6), the rotor coil 22 of an electric motor; the motor stator 20 is secured by screws 21 or otherwise to the stator element 10 and the projecting rotor shaft 27 carries a stabilizing or smoothing flywheel 23. This energization causes the motor rotor 22 and flywheel 23 to also rotate or accelerate in clockwise direction as viewed from the left end of Fig. 1. The resulting reaction on the stator, which is composed of both the motor stator permanent magnets 20 and the portion 10 secured thereto by the screws 21, causes it to turn in an opposite direction (counterclockwise as viewed from the left end of Fig. 1). That is, the reaction effect on the stator 10 is in opposition to the torque applied by offset weight 13 and "lifts" the weight and turns the stator 10 and commutator 15 so as to interrupt the rotor energization circuit established through conducting segment 16 and brush 17; when this circuit interruption occurs the stator and offset weight are "freed" so that the weight may again turn the stator 10 clockwise, assuming continuance of acceleration, and re-establish the circuit through segment 16 and brush 17. This energization and de-energization continues as long as acceleration is present. It has been found that the rotating torque thus applied to the motor rotor and flywheel comprises a series of energy pulses which are proportional to the linear acceleration applied to the entire device along the acceleration axis; that is, rotary acceleration of the motor system is proportional to the applied linear acceleration, which will, of course, be the linear acceleration of the vehicle carrying the accelerometer.

As shown, a centrifugal switch mechanism or "governor" 26 is integral with the rotor 22 and when the rotor has reached a predetermined rotational speed, as a result of the series of applied energy pulses occasioned by applied linear acceleration, the switch 26 will be actuated to establish or interrupt, as the case may be, some appropriate circuit; the linear velocity attained is the time of centrifugal switch action. The appropriate circuit, of course, may in turn control any suitable device or mechanism, e. g., means for cutting off fuel supply to a rocket motor of the transporting vehicle. While the switch mechanism is of normally closed type in which a leaf spring or reed 28 maintains contacts 29 and 30 in engagement with each other until the rotor 22 reaches some desired predetermined speed and centrifugal force opens the contacts, it will be clear that it may be normally open so that it will close when the rotor reaches desired rotational speed.

In some instances it may be desired to obtain a circuit opening or closing signal when the accelerometer carrying vehicle has travelled a predetermined distance. This may be achieved by substituting for the centrifugal switch 26 a suitable revolution or pulse counting device (not shown).

While any suitable motor and centrifugal switch may be secured to stator portion 10, excellent results are obtainable by utilizing a commercially available 26-volt, direct current, permanent magnet field, motor with integral centrifugal switch or speed governor. The centrifugal-force-operated governor spring 28 may be selected so as to effect opening at any desired rotor speed.

In some instances, for example where it is desired to counteract the effect of the offset weight until attainment of some particular acceleration value, opposing yieldable means such as a spring 33 may be employed. The spring may be of the torsion spiral variety with one end secured to a hub portion 34 of stator 10 and its other end looped around a combined support and guide roller 35 that is fastened to an adjacent portion of the support means 1. Where a spring is utilized it will be of any appropriate strength such that the pull or force utilized is sufficient to prevent the offset weight 13 from turning the stator 10 until the accelerometer is subjected to the predetermined acceleration value.

The accelerometer is not limited to use with a weight of only one mass. Weights of different appropriate masses may be substituted to obtain desired stator movement and rotor actuation with particular vehicles and accelerations.

The shaft or pivot pin 8 may be secured to the stator 10 in any suitable manner but is preferably affixed to a pivot block 37 that may be screwed to the end of the stator subsequent to insertion of the motor thereinto. The stator may be provided with recesses 38 to receive and assist in retaining against movement by acceleration forces the various conductors that join the motor coils and centrifugal switch with the commutator 15.

Figure 2:
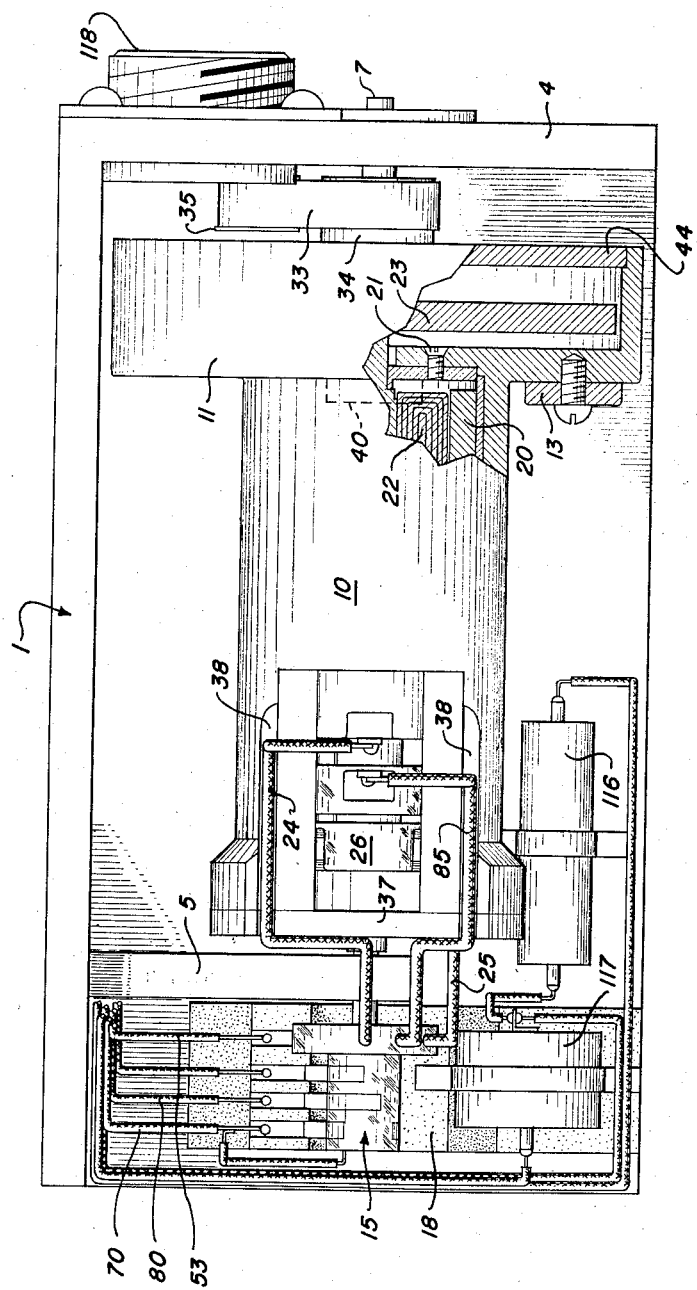
Fig. 2 is a top plan view, partly broken away and with a relay box omitted, of the preferred embodiment of the invention shown in Fig. 1.

With the weight 13 disposed on the stator 10 as illustrated in Figs. 1 and 2, the accelerometer will normally be mounted on a vehicle that accelerates in the general direction of the arrow "A," as the effect of the weight, sensitivity and accuracy are thus maximum. If desired, the weight may be secured to the stator at any other suitable position, for example, the location 40 and mounted on a vehicle that accelerates in the direction of arrow "B."

Preferably means is provided for assuring against the stator accidentally rotating through an angle such that the weight 13 is in initial alignment with an acceleration vector through the longitudinal axis of the stator. As shown, this means may comprise a stop pin 42 affixed to the support wall 5 which cooperates with a stator shoulder 43 formed by cutting away a portion thereof. The weight is thus always maintained within an appropriate quadrant or zone for subjection to the effect of accelerations.

The flywheel 23 may be exposed within the casing or support means 1 but it has been found that enhanced results and efficiencies are obtained by closing flywheel enclosure 11 with an end plate 44, which end plate may carry stator shaft 7. It was previously pointed out that for optimum results weights 13 of different mass may be substituted for utilizing the accelerometer with different vehicles and acceleration conditions; such is also true as to substitution of flywheels 23 of different mass. Different end plates 44, with hub portions 34 of appropriate radii, may also be substituted for "winding" a portion of a restraining spring 33 thereon. It will be understood that such changes or substitution may be made either singly or in any suitable combinations depending upon the conditions of usage.

Figure 6:
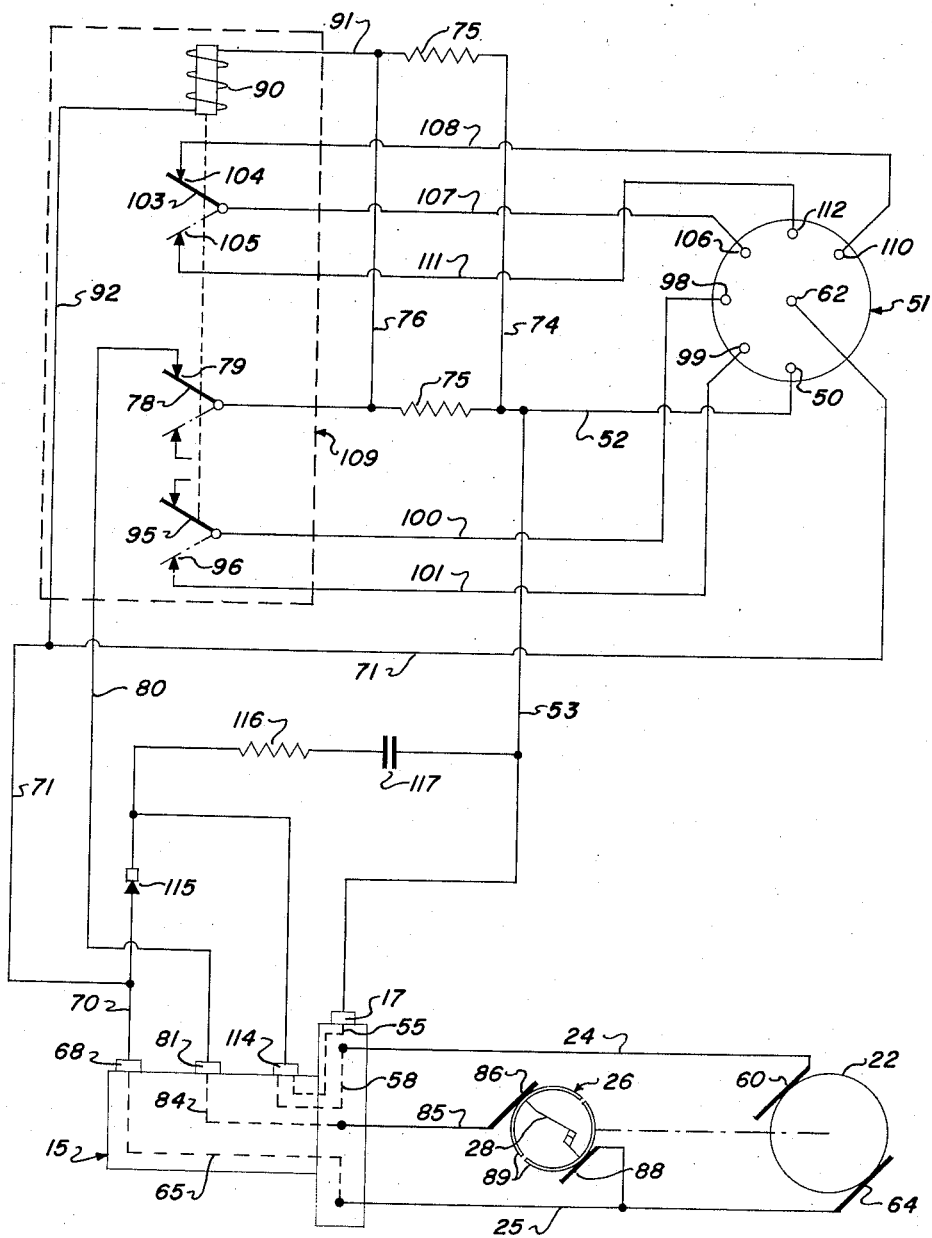
Fig. 6 is a diagrammatic representation showing electric circuitry that may be utilized with the present accelerometer.

A preferred electric circuitry is shown more particularly in the more or less diagrammatic representations of Figs. 5 and 6. When stator 10 rotates in response to acceleration so as to move conducting segment 16 of commutator 15 into contact with brush 17 power is supplied to rotor 22 from terminal 50 of connector 51, through leads 52, 53, brush 17, conducting segment 16 of the commutator, jumper 55 embedded in the commutator, commutator segment 57 that is connected with the jumper 55, jumper 58 embedded in the commutator, and conductor 24 which connects with motor brush 60. The return path from rotor 22 is to outlet terminal or pin 62 through brush 64, conductor 25, jumper 65 embedded in the commutator, commutator segment 67, brush 68, and conductors 70 and 71. This circuitry is established each time the weight 13 "lowers" under the influence of acceleration and rotates the stator, and is broken each time the reactive force established by rotor 22 causes stator 10 to rotate in an opposite direction and overcome the effect of acceleration on the stator and its offset weight 13.

In addition to the above described circuit path through the rotor coils, current from terminal or pin 50 and conductor 52 flows continually through the centrifugal switch 26 from the time a master switch (not shown) is closed to supply current to terminal 50 until the time that the rotor accumulates such rotational speed that centrifugal force overcomes the effect of leaf spring or reed 28 and opens the circuit through the centrifugal switch. The circuit path for the centrifugal switch prior to opening thereof is from terminal or pin 50, conductor 52, conductor 74, resistors 75, conductor 76, switch blade 78, contact 79, conductor 80, brush 81, commutator segment 82, commutator jumper 84, conductor 85, brush 86, appropriate of the conducting semicircular segments 89, switch blade or reed 28, brush 88, and conductor 25, from which the return path to connector pin 62 is the same as that of rotor 22. While two resistors 75 are shown this is for convenience and compactness and more or less may be employed as appropriate.

Current from the outlet side of resistors 75 does not energize relay coil 90 until such time as the switch 26 opens due to centrifugal force created by rotor 22 building up to sufficient speed. When the rotor 22 has built up sufficient speed to open switch 26 and interrupt the circuit path therethrough, current from the outlet ends of resistors 75 flows through conductor 91, relay coil 90, conductor 92, to the conductor 71 and thence to the return pin or terminal 62 of the connector 51. Energization of relay coil 90 opens the normally closed switch blade 78 and continues to hold it open, so that even through the conducting spring or reed 28 of switch 26 may subsequently close the previously described circuit therethrough is not re-established.

Energization of relay coil 90 also serves to close the normally open switch blade 95 against contact 96 and establish a circuit between connector pins 98 and 99 via the conductors 100 and 101. In addition, the relay coil shifts the switch blade 103 from a normally closed position against contact 104 to contact 105 so as to interrupt the circuit from connector terminal 106 through conductor 107, switch blade 103 and conductor 108 to terminal 110 and to establish a new circuit from the conductor 107 to contact 105 and thence through conductor 111 to connector terminal 112. The relay coil 90 switch blades 78, 95, 103 and associated mechanism are preferably enclosed within a suitable receptacle 109 which is clamped to the housing 1.

The relay coil 90 may be utilized to establish or interrupt any other appropriate circuitry, that disclosed between the pins 98, 99 and between pins 106, 110, 112 being merely by way of illustration.

The diode 115 shown connected in parallel via brushes 68 and 114 with the rotor 22, and the resistor 116 and capacitor 117 shown in parallel with the acceleration sensing switch or commutator and its conducting segments serve in more or less conventional manner as arc suppressor means.

For clarity of description and illustration various conductors or cables have been omitted from Figs. 1 and 2, but it will be understood that the various disclosed components normally will be connected as illustrated in Figs. 5 and 6, the connector 51 being secured to the end wall 4 of housing 1 so as to project partially through the opening 118. The conductors will extend from this connector to the relay receptacle 109 and resistors 75 illustrated at the upper part of Fig. 1, to the resistor 116, capacitor 117, and diode 115, the interconnection of the various brushes, commutator segments, rotor coil 22 and switch 26 being illustrated more particularly in Fig. 6.

A gasket and cover (not shown) will normally be secured to edges of the housing 1 to completely enclose the device and protect it from dirt, water, etc.

While the present disclosure is with reference to only a single accelerometer, it will be clear that a plurality may be simultaneously employed in a single vehicle for controlling any desired number of circuits.

It will be seen that the present invention provides a new and improved accelerometer of relatively simple and compact construction which is highly sensitive to acceleration forces and which provides highly accurate indications. The compactness of the device is readily apparent when it is realized that in one size the length is about 5½ inches, width little more than 3 inches, and height less than 4½ inches. Another size is even smaller. The device does not depend upon a yieldable bellows, diaphragm or the like to force fluid through one or more orifices and is therefore free of possible drawbacks or difficulties due to aging of bellows or diaphragm, variation of fluid viscosity due to temperature changes that may range for example anywhere from a high of about 170° F. to a low of about −70° F., differences in fluid flow through orifices of supposedly identical accelerometers due to non-uniformity of orifices, etc. While necessarily a delicate instrument the present electrical accelerometer is of rugged construction and well adapted to withstand rapid accelerations and all normal usage or handling to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising a support, means rotatably mounted on the support including an electric motor stator and having a mass thereon at a location spaced from a rotational axis of the means for rotating the means when the device is subjected to acceleration, an electrically conducting element operatively connected and movable with said means for establishing and disestablishing an electric circuit in response to rotary movements of said means in opposite directions, an electric motor rotor concomitant with said means and said stator for energization and de-energization in response to establishing and disestablishing of the referred to circuit, and centrifugal switch means rotatable with said rotor actuable upon attainment of predetermined rotor rotational rate.

2. A device of the character described comprising a support, means carried by the support including a rotor of an electric motor and a rotatable stator of said electric motor concomitant with said rotor, a mass connected with said stator at a location spaced from the rotational axis thereof, a first electric terminal, an additional electric terminal electrically connected with an energization circuit for said rotor and movable with the stator to engage and disengage said first terminal, and switch means operatively connected with the rotor actuable upon attainment of predetermined rotor rotation speed, translation of the device in one direction effecting movement of said mass and stator rotation for engagement of said electric terminals and control of the energization circuit of said rotor.

3. A device as claimed in claim 2, in which stop means is provided for limiting the extent of rotation of the stator.

4. A device as claimed in claim 3, in which the stop means comprises a projection carried by the support and a plurality of shoulder portions carried by the stator and angularly spaced from each other and each adapted to contact said projection.

5. A device as claimed in claim 2, in which said additional electric terminal is of generally arcuate configuration and is connected with and movable with said stator.

6. A device as claimed in claim 2, in which a flywheel is operatively connected with and rotatable with said rotor.

7. A device as claimed in claim 2, in which a flywheel is operatively connected with and rotatable with said rotor and the flywheel is enclosed by a portion of the stator.

8. A device of the character described comprising a support, means carried by the support including an electrically excitable rotor and a rotatable stator concomitant with said rotor and exterior thereof, a mass carried by said stator at a location spaced from the rotational axis thereof, yieldable means for urging the stator and mass toward a first position, a first electric terminal, an additional electric terminal electrically connected with an energization circuit for said rotor and movable with the stator to engage and disengage said first terminal, and switch means operatively connected with the rotor actuable upon attainment of predetermined rotor rotation speed, translation of the device in one direction effecting rotation of said stator in opposition to the yieldable means for engagement of said electric terminals and establishment of the circuit to energize said rotor.

9. A device as claimed in claim 8, in which the yieldable means comprises a spring secured adjacent one end thereof to a portion of the stator and adjacent another end thereof to the support.

10. A device as claimed in claim 9, in which the spring is of generally spiral configuration.

11. A device as claimed in claim 8, in which the yieldable means comprises a spring secured adjacent one end thereof to a portion of the stator and adjacent another end thereof to a roller carried by the support.

12. A device of the character described comprising a support, means carried by the support including an electrically energizable rotor and a rotatable stator extending at least partially about said rotor, a mass carried by said stator at a location spaced from the rotational axis thereof, an electric terminal carried by the support, an additional electric terminal electrically connected with an energization circuit for said rotor and operatively connected with the stator and movable therewith to engage and disengage the first mentioned terminal, and switch means operatively connected with the rotor actuable upon attainment of predetermined rotor rotation speed, translation of the device in one direction effecting rotation of said stator for engagement of the electric terminals and control of the circuit of said rotor.

13. A device of the character described comprising a pair of spaced apart arm members, generally tubular means intermediate said arm members, support means rotatably supporting the tubular means on the arm members, a mass carried by the tubular means at a location spaced from an axis through the support means, means for limiting the extent of rotation of the tubular means, an electric motor within said tubular means having a stator affixed to the tubular means and having a rotor within said stator, means operatively connected with the tubular means and movable in response to rotation thereof for establishing and disestablishing a power supply circuit to said rotor, and centrifugal switch means within the tubular means rotatable with the rotor actuable in response to rotor rotation for controlling an associated circuit.

14. A device of the character described comprising a support, turnable means rotatably mounted on the support including an electric motor stator carrying a mass at a location spaced from a rotational axis thereof for turning the means when the device is subjected to acceleration, an electrical motor rotor at least partially within said stator, means operatively connected with the turnable means and movable in response to turning thereof for establishing and disestablishing a power supply circuit for said rotor, and switch means rotatable with the rotor actuable upon attainment of a predetermined rotor speed for controlling an associated circuit.

References Cited in the file of this patent

UNITED STATES PATENTS

| | | |
|---|---|---|
| 2,111,423 | Given | Mar. 15, 1938 |
| 2,231,439 | Dudenhausen | Feb. 11, 1941 |
| 2,672,334 | Chenery | Dec. 15, 1948 |
| 2,792,460 | Bleeze | May 14, 1957 |
| 2,801,097 | Adamson | July 30, 1957 |
| 2,816,748 | Woestemeyer | Dec. 17, 1957 |